US012372007B2

(12) United States Patent
Schweitzer

(10) Patent No.: US 12,372,007 B2
(45) Date of Patent: Jul. 29, 2025

(54) STATOR VANE COMPRISING A HEAT PIPE

(71) Applicant: SAFRAN AIRCRAFT ENGINES, Paris (FR)

(72) Inventor: Laurent Schweitzer, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/720,918

(22) PCT Filed: Dec. 19, 2022

(86) PCT No.: PCT/FR2022/052426
§ 371 (c)(1),
(2) Date: Jun. 17, 2024

(87) PCT Pub. No.: WO2023/118720
PCT Pub. Date: Jun. 29, 2023

(65) Prior Publication Data

US 2025/0059896 A1 Feb. 20, 2025

(30) Foreign Application Priority Data

Dec. 20, 2021 (FR) ...................................... 2114033

(51) Int. Cl.
*F01D 25/12* (2006.01)
*F01D 9/02* (2006.01)
(Continued)

(52) U.S. Cl.
CPC ............... *F01D 25/12* (2013.01); *F01D 9/02* (2013.01); *F01D 9/041* (2013.01); *F15B 21/04* (2013.01);
(Continued)

(58) Field of Classification Search
CPC . F01D 25/12; F01D 9/02; F01D 9/041; F15B 21/04; F15B 21/0423; F15B 21/0427; F05D 2240/12; F05D 2260/208
See application file for complete search history.

(56) References Cited

U.S. PATENT DOCUMENTS 4,419,044 A * 12/1983 Barry ...................... F01D 11/24 415/117
7,900,438 B2 * 3/2011 Venkataramani ... F28D 15/0275 244/134 B (Continued)

FOREIGN PATENT DOCUMENTS

CA 2597454 A1 * 2/2008 ............. F01D 25/12
CA 2910455 A1 * 11/2014 ............. F01D 25/24

(Continued)

OTHER PUBLICATIONS

International Search Report for PCT/FR2022/052426 dated Mar. 3, 2023.

*Primary Examiner* — Brian Christopher Delrue
(74) *Attorney, Agent, or Firm* — McDonald Hopkins LLC

(57) ABSTRACT

An aerodynamic element of a turbomachine including a body extending according to a radial main direction and a radial end located at a radial end of the body. The aerodynamic element further includes a heat exchanger between an internal fluid of the turbomachine and an airflow flowing around the body of the aerodynamic element. The heat exchanger includes a heat pipe in which a working fluid circulates and as well as an evaporation portion in which the working fluid exchanges heat with the internal fluid and a condensation portion in which the working fluid exchanges heat with the airflow.

9 Claims, 3 Drawing Sheets

(51) Int. Cl.

| | |
|---|---|
| ***F01D 9/04*** | (2006.01) |
| ***F15B 21/04*** | (2019.01) |
| ***F15B 21/0423*** | (2019.01) |
| ***F15B 21/0427*** | (2019.01) |

(52) U.S. Cl.

CPC ...... *F15B 21/0423* (2019.01); *F15B 21/0427* (2019.01); *F05D 2240/12* (2013.01); *F05D 2260/208* (2013.01)

(56) References Cited

U.S. PATENT DOCUMENTS

| | | | | |
|---|---|---|---|---|
| 10,378,556 | B2 * | 8/2019 | Zaccardi | F02K 3/06 |
| 10,392,952 | B2 * | 8/2019 | Zaccardi | F01D 9/065 |
| 10,669,872 | B2 * | 6/2020 | Zaccardi | F02K 3/115 |
| 10,830,076 | B2 * | 11/2020 | Zaccardi | B22F 5/04 |
| 11,655,761 | B2 * | 5/2023 | Toubiana | F02C 7/06 60/226.1 |
| 2007/0199384 | A1 * | 8/2007 | Kuznar | G01K 13/02 374/E13.006 |
| 2010/0236215 | A1 * | 9/2010 | Venkataramani | F01D 9/065 60/39.093 |
| 2010/0236217 | A1 * | 9/2010 | Venkataramani | F02C 7/047 60/266 |
| 2011/0146229 | A1 * | 6/2011 | Bajusz | F02C 7/14 415/178 |
| 2011/0268562 | A1 * | 11/2011 | Knight, III | F01D 5/18 415/179 |
| 2014/0165570 | A1 * | 6/2014 | Herring | F02C 7/14 60/730 |
| 2016/0305279 | A1 * | 10/2016 | Gerstler | F01D 9/04 |
| 2017/0204879 | A1 * | 7/2017 | Zaccardi | F02K 3/06 |
| 2017/0363007 | A1 * | 12/2017 | Xu | F23R 3/005 |
| 2018/0045063 | A1 * | 2/2018 | Frey | C04B 35/80 |
| 2019/0145264 | A1 * | 5/2019 | Jonnalagadda | F01D 9/041 415/115 |
| 2020/0347737 | A1 * | 11/2020 | Bordoni | F01D 5/187 |
| 2021/0156309 | A1 * | 5/2021 | Dreano | F02C 7/14 |
| 2022/0162952 | A1 * | 5/2022 | Zaccardi | F02C 7/185 |
| 2024/0018905 | A1 * | 1/2024 | De Carné-Carnavalet | F02C 7/18 |

FOREIGN PATENT DOCUMENTS

| | | | | | |
|---|---|---|---|---|---|
| DE | 4336143 | A1 | * | 5/1995 | F02C 7/16 |
| EP | 3244039 | A1 | * | 11/2017 | |
| EP | 3779128 | A1 | * | 2/2021 | |
| FR | 2915519 | A1 | * | 10/2008 | F01D 25/12 |
| FR | 3028576 | B1 | * | 12/2016 | F01D 25/12 |
| FR | 3046200 | A1 | * | 6/2017 | F02C 7/14 |
| FR | 3064295 | A1 | * | 9/2018 | F01D 25/18 |
| FR | 3078367 | A1 | | 8/2019 | |
| GB | 2569695 | A | * | 6/2019 | F01D 25/02 |
| JP | 2011-236894 | A | | 11/2011 | |
| WO | WO-2024008698 | A1 | * | 1/2024 | F02C 3/22 |

* cited by examiner

STATOR VANE COMPRISING A HEAT PIPE

CROSS-REFERENCE TO RELATED APPLICATIONS

This is the National Stage application of PCT international application PCT/FR2022/052426, filed on Dec. 19, 2022, which claims the priority of French Patent Application No. 2114033, filed Dec. 20, 2021, both of which are incorporated herein by reference in their entireties.

TECHNICAL FIELD

The invention relates to an aerodynamic element of a turbomachine such as a vane or a profiled casing arm, including means for cooling a fluid circulating in the turbomachine. More particularly, the invention relates to an aerodynamic element including an internal heat exchanger which does not disturb the circulation of air around the latter.

PRIOR ART

A turbomachine, in particular an aircraft turbomachine, includes a plurality of components whose temperature increases during the operation of the latter.

The turbomachine includes one or more cooling circuit(s) allowing keeping these components at optimum temperatures for operation thereof or at temperatures at which the components do not risk deteriorating.

Among these members, mention may be made, for example, of: fluid, solid, magnetic or roller bearings, transmission or reduction devices, couplers, combustion chambers, stator vanes in the primary flow path, pumps, electric current generators, electric motor, orientable or fixed exhaust nozzle.

For cooling of some of these components, a pipe of an internal fluid is used which draws heat from these components and which is cooled afterwards by heat exchange with a flow of fresh air circulating in the turbomachine.

A known type of heat exchanger is arranged in the wall of an airflow secondary flow path and is commonly referred to as SACOC (standing for Surface Air Cooled Oil Cooler). In order to be able to exchange enough heat, even when sized as tight as possible, such a heat exchanger type results in aerodynamic losses by additional drag. Another known type of heat exchanger is arranged in a fixed stator vane, the first function of which is to redirect the circumferential momentum of the secondary airflow, due to the passage of the airflow in the fan, into a momentum that is useful for thrust.

The document FR-3.078.367 describes an example of such a vane, which includes an internal circuit for the circulation of the internal fluid.

It is then the vane itself which acts as a heat exchanger and unlike the SACOC-type heat exchangers, it does not cause any additional significant aerodynamic loss.

However, the vane is exposed to degradations because it is exposed to impacts of various elements that might be ingested by the fan such as birds, hailstones, frost plates or projections of objects on takeoff. These degradations might then lead to a leakage of the internal fluid and thus a risky operation of the turbomachine, and even to stoppage of the latter.

The invention aims to provide an aerodynamic element of a turbomachine designed so as to enable an efficient exchange of heat between the internal fluid and the air flowing in the secondary flow path and not risking experiencing fluid leakages in the event of damages.

DISCLOSURE OF THE INVENTION

The invention provides a turbomachine aerodynamic element including a body extending according to a radial main direction and a root radial end located at a radial end of the body, the vane further including a heat exchanger between an internal fluid of the turbomachine and an airflow flowing around the body of the vane, characterised in that the heat exchanger includes a heat pipe in which a working fluid circulates and comprising an evaporation portion in which the working fluid exchanges heat with the internal fluid and a condensation portion in which the working fluid exchanges heat with the airflow.

The heat pipe integrated into the vane allows bringing the internal fluid circuit of away from the exposed portion of the vane which could be damage.

Thus, there is no risk of leakage of the internal liquid.

Preferably, the evaporation portion includes a working fluid accumulator arranged in the root of the vane, at which the working fluid exchanges heat with the internal fluid.

Preferably, the root includes a circulation pipe of the internal fluid which is fluidly isolated from the heat pipe and which extends around the accumulator.

Preferably, the geometry of the cavities and walls of the exchanger is optimised so as to ensure the best possible heat exchange between the two fluids, through a trade-off between a large exchange surface area and a good circulation of the fluids. According to one embodiment, the circulation pipe has a helical shape centred on the accumulator.

Preferably, and for integration concerns, the circulation pipe includes two ends which are arranged in the root.

Preferably, the evaporation portion includes a vapour pipe extending radially from the accumulator, in which the reheated fluid evaporates and circulates freely towards the condensation portion.

Preferably, the condensation portion includes cooling geometries promoting the temperature exchange and the flow of the condensates, which, according to one embodiment, could consist of fins extended by thin cooling pipes which are in fluid communication with the vapour pipe on one side, which open into a recuperator.

Preferably, the condensation surfaces and pipes are arranged in the body of the vane.

Preferably, the heat pipe includes an internal fluid recovery pipe which sets the recuperator in communication with the accumulator and in which the working fluid in liquid form circulates separately from most of the gaseous phase originating from the evaporator.

Preferably, at least the recovery pipe is designed so that the condensed internal fluid flows therein by gravity or by capillarity.

Preferably, the amount, the chemical composition and the internal pressure of the working fluid of the heat pipe are selected so as to ensure a proper heat exchange under all possible operating conditions of the turbomachine.

DETAILED DISCLOSURE OF THE INVENTION

Figure 1:
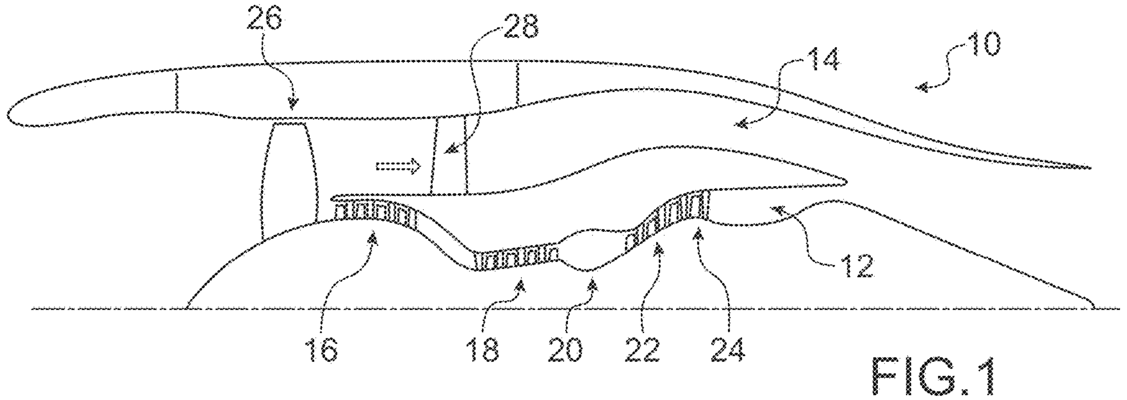
FIG. 1 is a schematic illustration in axial half-section of a turbomachine, showing a casing arm acting as a stator vane with the positioning of SACOC type exchangers, according to the prior art (to be illustrated).

FIG. 1 schematically shows a bypass-type aircraft turbomachine 10, which includes a primary gas flow path 12 and a secondary gas flow path 14 which are centred on a main axis of the turbomachine.

The primary flow path 12 includes, in the direction of gas flow in the latter: a low-pressure compressor 16, a high-pressure compressor 18, a combustion chamber 20, a high-pressure turbine 22 and a low-pressure turbine 24.

The secondary gas flow path 14 extends radially around the primary flow path 12 and an airflow flows axially throughout the latter.

Upstream of the primary flow path 12 and of the secondary flow path 14, the turbomachine 10 includes a fan 26 intended to induce an additional axial movement of the airflow entering the turbomachine 10.

The secondary flow path 14 includes, at its upstream end, a stator consisting of a plurality of aerodynamic elements 28, acting as fixed vanes, distributed around the main axis of the turbomachine, the purpose of which is to redirect the circumferential momentum of the secondary airflow into an axial momentum that is useful for thrust.

These aerodynamic elements 28 consist of radial arms commonly so-called casing arms or vanes.

The turbomachine 10 also includes components (not shown) whose temperature is brought to increase during the operation of the turbomachine 10 and a circuit for cooling these components.

The cooling circuit uses an internal fluid which is preferably an oil also serving as a lubricant for these components.

The internal fluid draws heat from the components to cool them down and consequently heats up.

The cooling circuit also includes one or more heat exchange device(s), generally projecting from the walls in the secondary flow path 14, each allowing cooling the internal fluid by discharging this heat in the airflow flowing in the secondary flow path 14.

Alternatively, each heat exchange device may also be arranged in a vane 28 of the stator. Thus, the heat is conducted by the constituent material of the vane 28 from the internal fluid towards the airflow.

In the following description, reference will be made to an aerodynamic element of the turbomachine by designating it as vane. It should be understood that this designation also covers any casing arm, or any other fixed vane, which includes a heat exchange device.

The description of each other vane including such a heat exchange device will be deduced by similitude of this following description.

Figure 2:
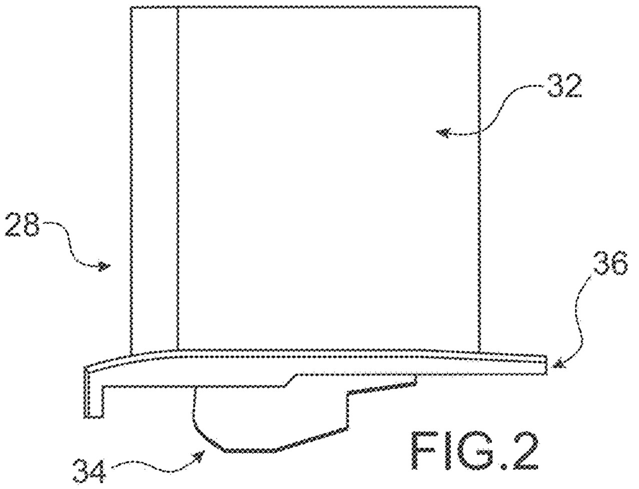
FIG. 2 is a side view of a vane shown in FIG. 1, including a heat exchanger according to the invention.

As shown in more details in FIG. 2, the vane 28, which is primarily directed radially with respect to the main axis, includes a body 32 which extends throughout the secondary flow path, an inner radial end 34 of the root by which the vane 28 is fastened to a structural element of the turbomachine 10 (not shown) and a platform 36 for reconstituting the radially inner wall of the secondary flow path 14.

According to the invention, the heat exchange device includes a heat pipe 38 which extends at least partially in the body 32 which acts as an intermediate heat exchanger between the internal fluid and the airflow circulating in the secondary flow path 14.

The heat pipe 38 operates in a closed circuit in which a working fluid circulates by gravity or by capillarity and is able to evaporate by absorbing heat, which herein originates from the internal fluid, and then condense while releasing heat, herein by releasing heat into the airflow circulating in the secondary flow path 14.

The working fluid circuit being separated from the internal fluid circuit, a leakage in the heat pipe then does not result in an internal fluid leakage.

The heat pipe 38 includes an evaporation portion 40 in which the working fluid exchanges heat with the internal fluid and a condensation portion 42 in which the working fluid exchanges heat with the airflow circulating in the secondary flow path 14.

Figure 5:
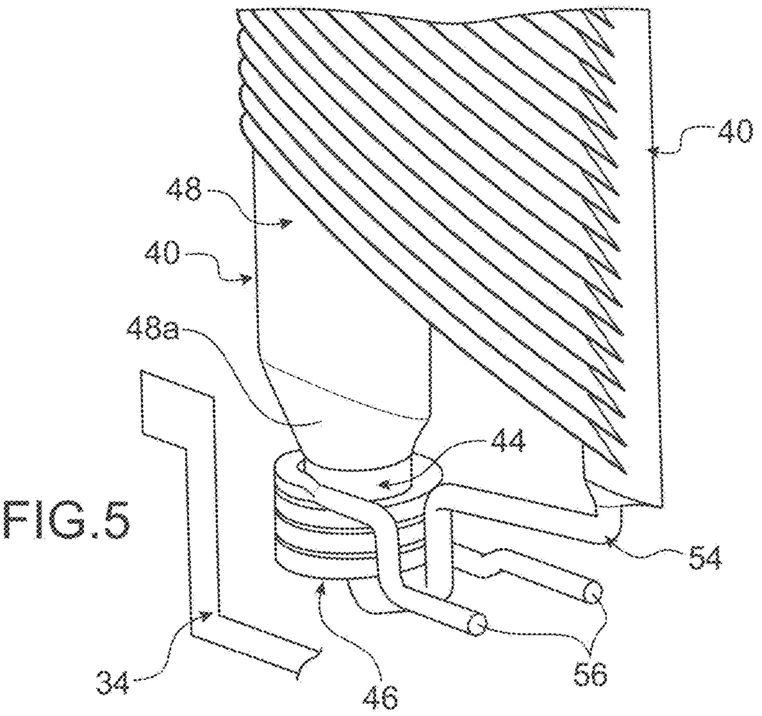
FIG. 5 is a detail on a larger scale of the vane shown in FIG. 4, showing the cooperation between the internal fluid circuit and the evaporation portion of the heat pipe.

As shown in more details in FIG. 5, the evaporation portion 40 includes an accumulator 44 in which the working fluid accumulates in liquid form.

This accumulator 44 is located in the vertically lowermost portion of the vane 28, i.e. herein in the root 34 of the vane 28.

The root 34 of the vane 28 also includes a circulation pipe 46 in which the internal fluid circulates, and which cooperates thermally with the accumulator 44 of the heat pipe 38.

According to the illustrated embodiment, the circulation pipe 46 surrounds the accumulator 44 of the heat pipe 39. It should be understood that the invention is not limited to this embodiment and that any other embodiment enabling a heat exchange between the accumulator 44 and the circulation pipe 46 may be considered. For example, the accumulator 44 and the circulation pipe 46 are entangled.

The circulation pipe 46 is separated from the accumulator 44 by material forming the root 34 of the vane 28 and this amount of material acts as a heat conductor from the circulation pipe 46 towards the accumulator 44.

The working fluid present in liquid form in the accumulator 44 heats up by the heat exchanged with the internal fluid and then evaporates.

By evaporating, the working fluid in gaseous form flows vertically upwards in the evaporation portion.

The evaporation portion 40 includes a vapour pipe 48 which is in fluid communication with the accumulator 44 and in which the vapour thus formed flows.

The vapour pipe 48 extends primarily radially throughout the vane 28 and extends from the root 34 up into the body 32.

It includes an internal radial end 48*a* which is connected to the accumulator and which is located in the root 34, the rest of the vapour pipe 48 is located in the body 32 of the vane 28.

The condensation portion 42 includes a plurality of fins 50 extended with tubules (not shown) which are arranged in the body 32 of the vane 28 and which are in thermal contact with the latter.

The fins 50, which will be referred to hereinafter as tubular fins, are also in fluid communication with the vapour pipe 48 so that the evaporated working fluid circulates in these.

The tubular fins 50 are intended to transmit heat from the working fluid in vapour form towards the wall of the body 32 of the vane 28. In turn, this wall of the body 32 of the vane 28 exchanges heat with the airflow.

The working fluid in the form of vapour cools down in the tubular fins 50 by losing heat and consequently condenses.

The condensation portion 42 includes a recuperator 52 with which the tubular fins 50 fluidly communicate. The working fluid that has condensed is conveyed from the tubular fins 50 towards the recuperator 52.

The recuperator 52 is also in fluid communication with the accumulator 44 via a recovery pipe 54 through which the condensed working fluid flows towards the accumulator 44 to exchange heat again with the internal fluid.

Thus, the working fluid circulates in a closed circuit of the heat pipe 38 by flowing successively in the vapour phase and then in the liquid phase, from the accumulator 44 towards the vapour pipe 48, the fins 50, the recuperator 52, the recovery pipe 54 and finally the accumulator 44.

Hence, there is no risk of mixing with the internal fluid of the turbomachine 10, even in case of degradation of the stator vane 28.

As said before, the circulation pipe 46 in which the internal fluid circulates is arranged in the root 34 of the vane 28. According to the described embodiment, the circulation pipe consists of a helical shaped cavity formed in the root 34. For optimum efficiency, the arrangement of the circulations of the two fluids may be subdivided and entangled.

Thus, the circulation pipe 46 includes two ends 56 by which the circulation pipe 46 is connected to the rest of the cooling circuit of the turbomachine.

Figure 3:
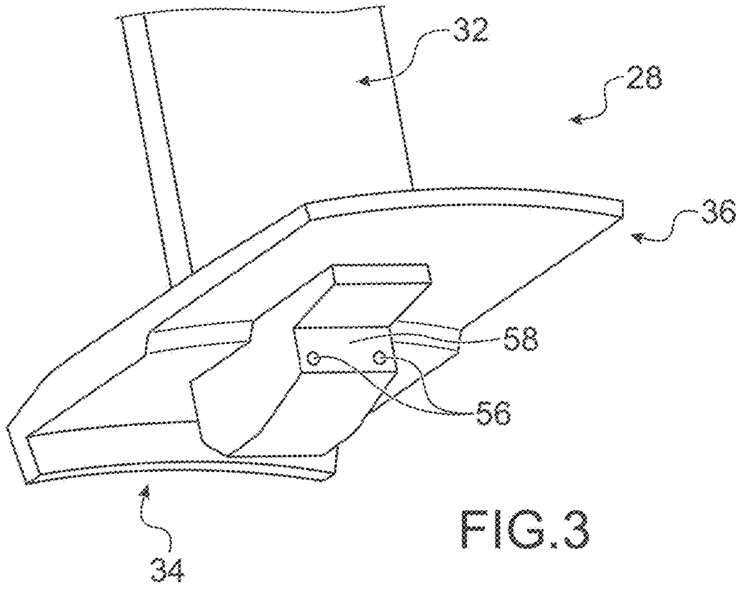
FIG. 3 is a schematic perspective illustration of the vane shown in FIG. 2, according to an embodiment wherein the guide vanes are located at the lower portion of the turbomachine and the heat exchanger is localised in the stator on the hub side.
Figure 4:
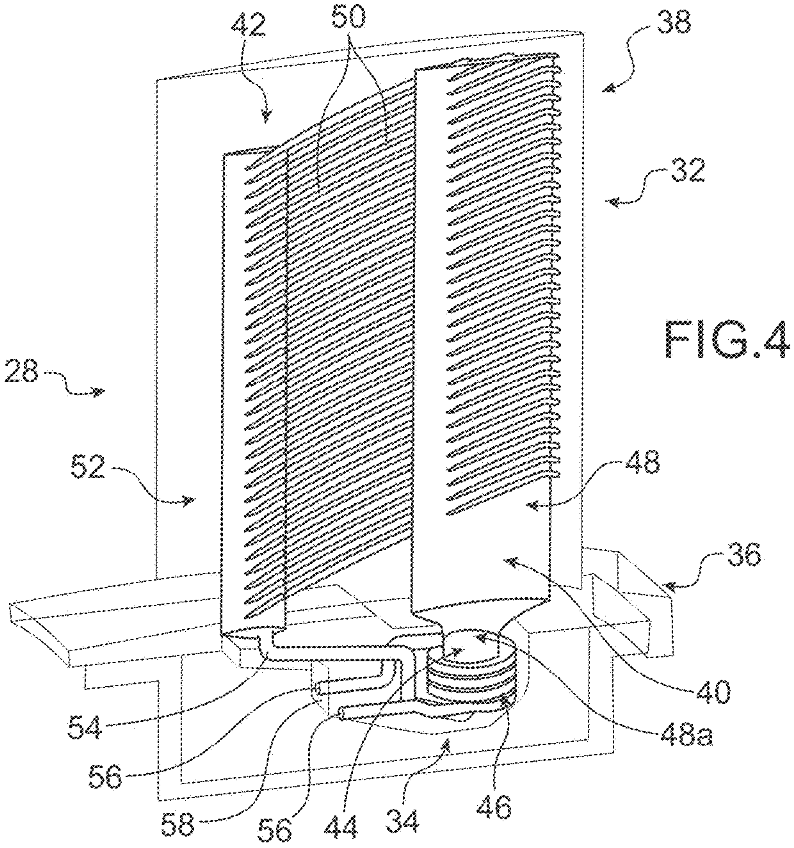
FIG. 4 is a schematic cut-away and transparent illustration of the vane according to the invention, showing the different portions of the heat pipe.

For convenience and in a non-restrictive manner, and as shown in FIG. 3, these two ends 56 are located in the same face 58 of the root.

As mentioned before, the cooling circuit may include one single vane 28 provided with a heat pipe or several vanes 28 which are distributed around the main axis of the turbomachine.

Thus, these vanes 28 may be arranged in the turbomachine with their main radial axis directed substantially vertically according to the terrestrial gravity with the root 34 located vertically under the body 32 or with their axis inclined with respect to the vertical direction with the root 34 located above the body 32.

The geometries of the different cavities of these non-vertical heat pipes could be optimised according to their inclinations to facilitate the circulation of the condensates.

Figure 6:
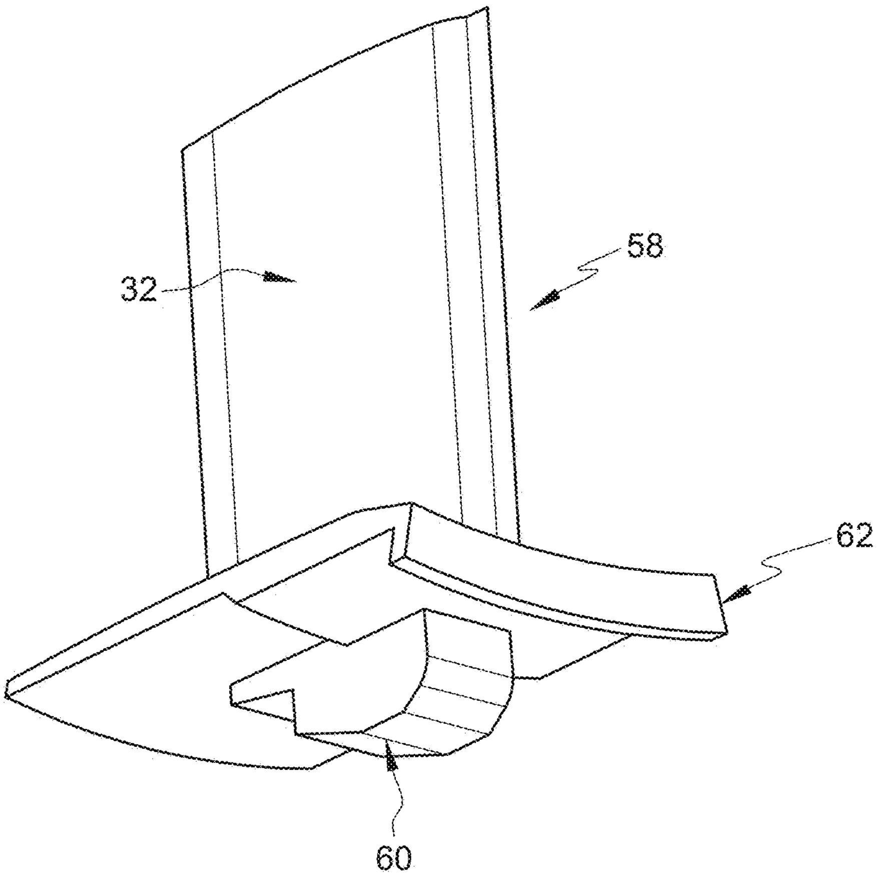
FIG. 6 is a view similar to that of FIG. 3, showing an embodiment wherein the stator vanes are located in the lower portion of the turbomachine and the heat exchanger is located in the external portion of the stator of the fan.
Figure 7:
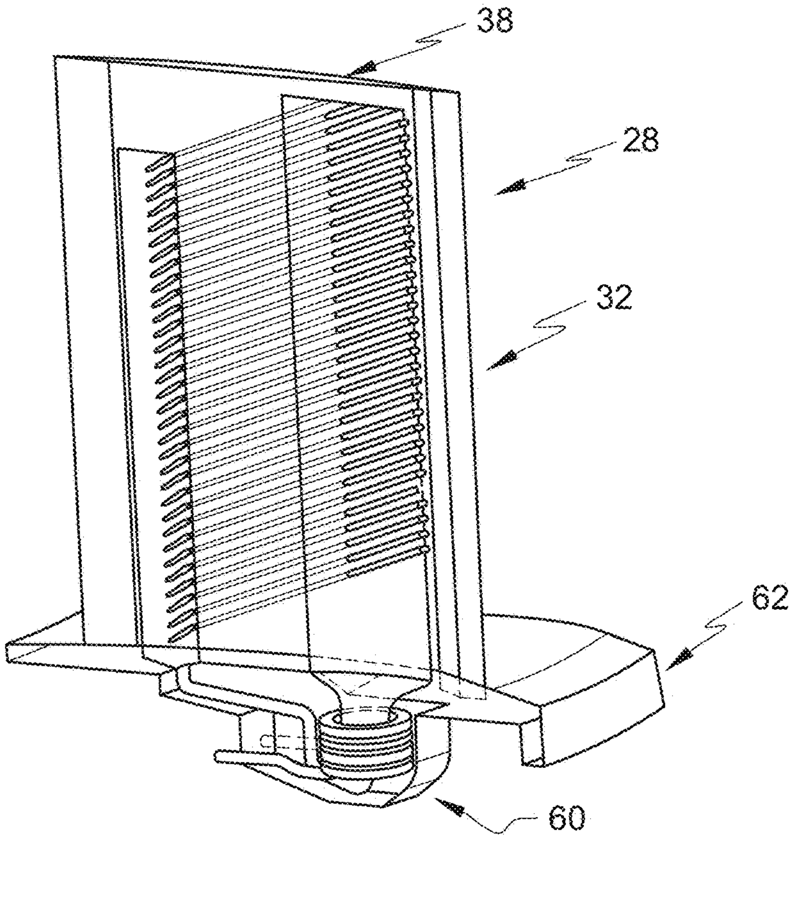
FIG. 7 is a schematic cut-away illustration of the vane shown in FIG. 6, showing the different portions of a heat pipe.

The vanes 28 that have just been described include an accumulator 44 and a circulation pipe 46 arranged in the root, i.e. they are located in the stator on the hub side of the turbomachine 10. Preferably, these vanes 28 are the vanes located above a horizontal midplane of the turbomachine 10, so that the terrestrial gravity promotes the flow of the working fluid in the heat pipe According to a variant shown in FIGS. 6 and 7, the illustrated vane 28 is intended to be located below the horizontal midplane of the turbomachine 10.

This vane 28 includes an outer radial end of the head 60 which is connected to the outer stator of the turbomachine.

A platform 62 for reconstituting the radially outer portion of the flow path is located between the head 60 and the body 32 of the vane 28.

According to this variant, the accumulator 44 and the circulation pipe 46 are arranged in the head 60, the rest of the heat exchange device is arranged in the body 32 of the vane and is deduced by similitude.

Alternatively, to enable the flow of the working fluid in the heat pipe 38 independently of the position of the vane 28 in the secondary flow path 14, the different pipes 54 and tubular fins 50 of the heat pipe 38 may be designed so as to cause a circulation of the working fluid by capillarity.

Alternatively, a mechanical device for forcing a circulation of the working fluid may be added in the closed circuit of the heat pipe 38, for example to distribute it over a larger evaporator.

The amount and nature of the working fluid used in the heat pipe 38 are determined so that the evaporation and condensation of the working fluid in the heat pipe 38 take place at the optimum operating conditions of the turbomachine.

In the case of multiple vanes with heat pipes in the cooling circuit, it is possible to make the internal characteristics (chemistry, pressure and amount of working fluid) of the different heat pipes vary in order to ensure an optimum overall heat exchange also under extreme temperature (hot or cold) operating conditions.

The invention claimed is:

1. A turbomachine aerodynamic element including a body extending according to a radial main direction and a radial end located at a radial end of the body, the aerodynamic element further including a heat exchanger between an internal fluid of the turbomachine and an airflow flowing around the body of the aerodynamic element, wherein the heat exchanger includes a heat pipe in which a working fluid circulates and comprising an evaporation portion in which the working fluid exchanges heat with the internal fluid and a condensation portion in which the working fluid exchanges heat with the airflow, wherein the condensation portion includes cooling tubes which are in fluid communication with the vapour pipe, which open into a recuperator and in which the working fluid circulates, wherein each of said cooling tubes has a first end ensuring fluid communication with the vapour pipe and a second end ensuring fluid communication with the recuperator, and wherein the vapour pipe and the recuperator are axially separate chambers.

2. The aerodynamic element according to claim 1, wherein the cooling tubes are arranged in the body of the aerodynamic element.

3. The aerodynamic member according to claim 1, wherein the heat pipe includes an internal fluid recovery pipe which sets the recuperator in communication with an accumulator and in which the working fluid in liquid form circulates.

4. The aerodynamic element according to claim 3, wherein at least the recovery pipe is designed so that the condensed internal fluid flows therein by gravity or by capillarity.

5. The aerodynamic element according to claim 1, wherein the evaporation portion includes a working fluid accumulator arranged in the radial end of the aerodynamic element, at which the working fluid exchanges heat with the internal fluid.

6. The aerodynamic element according to claim 5, wherein the radial end of the aerodynamic element includes a circulation pipe of the internal fluid which is fluidly isolated from the heat pipe and which extends around the accumulator.

7. The aerodynamic element according to claim 6, wherein the circulation pipe is designed so as to exchange heat with the accumulator.

8. The aerodynamic element according to claim 6, wherein the circulation pipe includes two ends which are arranged in the radial end of the aerodynamic element.

9. The aerodynamic member according to claim 5, wherein the evaporation portion includes a vapour pipe extending radially from the accumulator, in which the reheated fluid evaporates.

* * * * *